(12) United States Patent
Arlein

(10) Patent No.: US 11,059,975 B1
(45) Date of Patent: Jul. 13, 2021

(54) SNOW EQUIPMENT WAX FORMULATION

(71) Applicant: Peter Arlein, Carbondale, CO (US)

(72) Inventor: Peter Arlein, Carbondale, CO (US)

(73) Assignee: MOUNTAINFLOW ECO-WAX LLC, Carbondale, CO (US)

( * ) Notice: Subject to any disclaimer, the term of this patent is extended or adjusted under 35 U.S.C. 154(b) by 0 days.

(21) Appl. No.: 16/791,660

(22) Filed: Feb. 14, 2020

Related U.S. Application Data

(63) Continuation of application No. 16/734,244, filed on Jan. 3, 2020.

(51) Int. Cl.
| | |
|---|---|
| *C08L 91/06* | (2006.01) |
| *C08K 5/09* | (2006.01) |
| *C10M 159/06* | (2006.01) |
| *C10N 20/00* | (2006.01) |

(52) U.S. Cl.
CPC ............... *C08L 91/06* (2013.01); *C08K 5/09* (2013.01); *C10M 159/06* (2013.01); *C10M 2205/183* (2013.01); *C10N 2020/01* (2020.05)

(58) Field of Classification Search
CPC ............ C08L 91/06; C10M 159/06; C10M 2205/183; C10N 2020/01; C08K 5/09
See application file for complete search history.

(56) References Cited

U.S. PATENT DOCUMENTS

| | | | |
|---|---|---|---|
| 7,160,379 B1 * | 1/2007 | Shoshany | ............... C08L 91/06 106/271 |
| 2006/0107870 A1 | 5/2006 | Barnes | |
| 2006/0257643 A1 * | 11/2006 | Birger | ....................... C09C 3/08 428/323 |
| 2010/0087345 A1 | 4/2010 | Sparks | |

* cited by examiner

*Primary Examiner* — James C Goloboy

(74) *Attorney, Agent, or Firm* — Lewis Roca Rothgerber Christie LLP

(57) ABSTRACT

A snow equipment wax composition including between about 34-59 wt % of a first wax including at least one of candelilla wax, carnauba wax, rice bran wax and castor wax, between about 27-37% of a second wax including at least one of sunflower wax, bayberry wax, palm wax, and jojoba wax, and between about 15-20 wt % of a third wax including at least one of pillar blend soy wax, palm wax, natural vegetable wax, Japan wax, and stearic acid.

18 Claims, No Drawings

SNOW EQUIPMENT WAX FORMULATION

CROSS-REFERENCE TO RELATED APPLICATION

This application is a continuation-in-part of U.S. patent application Ser. No. 16/734,244, filed Jan. 3, 2020, the entire content of which is incorporated by reference.

FIELD

Embodiments of the present invention relate to waxes for snow equipment such as skis, snowboards, monoskis, snowbikes, snow blades, and any other equipment that is intended to be used to glide across snow.

BACKGROUND

A lubricating wax can be applied to the base or other snow-contacting surface of snow equipment intended to glide across snow. Such wax has been used for hundreds of years to improve the glide characteristics of snow equipment bases, particularly and primarily to overcome three types of friction: dry friction, wet friction, and electrostatic friction. Dry friction is caused by snow crystals rubbing against the base of the ski. Wet friction occurs when there is a high percentage of moisture in the snow and is caused by capillaries, or threads of water, that stick to the base of the ski and decrease speed. Electrostatic friction is caused by the electric properties of snow and the snow equipment base. Particularly, as the snow equipment moves through snow, electrons are transferred between the snow and the snow equipment creating an electric field. This electric field resists change such that as the snow equipment moves forward an electric force opposes this movement. The force is proportional to the charge developed between the snow equipment base and the snow and the distance between them. An effective snow equipment wax minimizes the effects of dry friction, wet friction, and electrostatic friction, while still being easily applicable to the snow equipment and having a sufficient durability to stay on the snow equipment over a desired time period or to travel a certain distance through snow.

A significant majority of snow equipment wax is made from petroleum-derived materials, including but not limited to paraffin and microcrystalline wax. In addition, some snow equipment wax is also made with fluorocarbons, which are a known carcinogen and are often referred to as a "forever chemical" due to their inability to breakdown in nature.

When snow equipment to which wax has been applied is used in snow, the wax can be stripped from the base of the snow equipment by snow crystals. Hence, the wax that is applied to snow equipment can end up in the snowpack and, consequently, the environmentally unfriendly petroleum and fluoro-based chemicals are introduced directly into the environment where they have been shown to subsequently enter the food chain. Accordingly, there is a need for an environmentally-friendly balanced wax formula that matches the performance of a conventional petroleum wax, but that does not contaminate the environment.

SUMMARY

A wax formulation is provided that can be formulated from components of natural origin, and particularly, components that do not include petroleum-derived materials. The wax formulation provides for high-quality lubricity, durability, and applicability to snow equipment.

In one embodiment, a composition includes between about 34-59 wt % of a first wax including at least one of candelilla wax, carnauba wax, rice bran wax and castor wax, between about 27-37% of a second wax including at least one of sunflower wax, bayberry wax, palm wax, and jojoba wax, and between about 15-20 wt % of a third wax including at least one of pillar blend soy wax, palm wax, natural vegetable wax, Japan wax, and stearic acid. In one embodiment, the composition may include at least 38 wt % of the first wax and at least 29 wt % of the second wax. In other embodiments, the composition may include at least 88% of the first wax, the second wax, and the third wax and may also include one or more colorants or fragrances.

In other embodiments, the composition may include at least 74 wt % of the first wax and the second wax or at least 94% of the first wax, the second wax, and the third wax.

In one embodiment, the composition may also include up to 15 wt % of one or more additional materials selected from the group of additional natural waxes, natural plant oils, and hydrogenated plant oils, which may all be of natural origin and in other embodiments.

Further, in one embodiment, the composition may include at least 4 wt % of a fourth wax including at least one of carnauba wax, candelilla wax, rice bran wax, and castor wax. In another embodiment, the composition may include and at least 1 wt % of jojoba oil.

In one embodiment, a composition includes at least 38 wt % of a first natural wax having a melting point between about 150° F.-170° F.; at least 29 wt % of a second natural wax having a melting point between about 160° F.-180° F.; and at least 20 wt % of a third natural wax having a melting point between about 125° F.-140° F. In other embodiments, the composition may include at least 88% of the first natural wax, the second natural wax, and the third natural wax or at least 94% of the first natural wax, the second natural wax, and the third natural wax.

In one embodiment, the composition may include at least 74 wt % of the first natural wax and the second natural wax, and in another embodiment may include at least 38 wt % of the first natural wax and at least 29 wt % of the second natural wax.

In other embodiments, the composition may include at least 4 wt % of a fourth natural wax including at least one of carnauba wax, candelilla wax, rice bran wax, and castor wax, and/or at least 1 wt % of jojoba oil.

Further, the composition may include up to 15 wt % of one or more additional materials selected from the group of additional natural waxes, natural plant oils, and hydrogenated plant oils and may also include one or more colorants or fragrances.

In another embodiment, the composition includes at least 65 wt % of candelilla wax and sunflower wax; at least 20 wt % of pillar blend soy wax; and up to 15 wt % of one or more additional materials selected from additional waxes, natural plant oils, and hydrogenated plant oils. In one embodiment, the one or more additional materials are all of natural origin.

In further embodiments, the composition may also include at least 4 wt % of carnauba wax and also may include at least 1 wt % of jojoba oil. Further, in some embodiments, the composition may include one or more colorants or fragrances.

In one embodiment, the composition may include at least 38 wt % of candelilla wax and at least 29 wt % of sunflower wax. In other embodiments, the composition may include at least 74 wt % of candelilla wax and sunflower wax and between 88-94 wt % of candelilla wax, pillar blend soy wax, and sunflower wax.

In further embodiments, the composition does not contain beeswax and does not contain non-pillar blend soy wax.

In one embodiment, the composition consists essentially of at least 65 wt % of candelilla wax and sunflower wax; at least 20 wt % of pillar blend soy wax; at least 4 wt % of carnauba wax; and up to 1 wt % of one or more of colorants, fragrances, and antioxidants.

In another embodiment, the composition consists essentially of at least 67 wt % of candelilla wax and sunflower wax; at least 20 wt % of pillar blend soy wax; at least 12 wt % of carnauba wax; and up to 1% wt % of one or more of colorants, fragrances, and antioxidants.

DETAILED DESCRIPTION

Embodiments of the present invention relate to an environmentally-friendly snow equipment wax that has appropriate lubricity, durability, and ease of application properties such that its performance matches the performance of conventional snow equipment waxes which include petroleum and fluoro-based chemicals that can cause undesirable environmental effects, including contamination of the food chain.

As used in the specification and claims of this application, the following terms are specifically defined as follows:

The term "consisting essentially of" or "consist essentially of" refers to a composition that contains no ingredients other than those specifically listed except that an additional ingredient may be present if it is of a character and in an amount that it does not materially change the characteristics of the composition as a whole with respect to ease of application to snow equipment, durability, and lubricity enhancement.

The term "natural origin" or "natural" refers to components, particularly waxes and oils, that are of plant or animal origin, or a hydrogenated oil of plant or animal origin.

The term "snow equipment" refers to skis, snowboards, monoskis, snowbikes, snow blades, and any other equipment that is intended to be used to glide across snow.

The term "pillar blend soy wax" refers to soy wax that has been hydrogenated with a particular blend of oils, soy-based hardeners, and/or other additives such that pillar blend soy wax has a higher melting point than standard soy wax.

When developing a wax, several primary characteristics are taken into account, including lubricity, i.e., the ability of the wax to reduce resistance in different snow conditions, durability, i.e., the ability of the wax to be maintained on the snow equipment to provide an acceptable level of lubricity without having to be reapplied, and ease of application, i.e., the ability of the wax to be applied to the snow equipment, for example, by using a hot wax and scrape technique or other standard techniques.

In order for the wax to be a viable product, the three primary characteristics of lubricity, durability, and applicability should be balanced within the wax because they tend to compete with each other. For example, more durable wax that has a lower coefficient of friction (a "faster" wax) is typically more rigid and thus more difficult to apply. A wax that is easier to apply can be softer and can have a higher coefficient of friction, thus making it "slower" and less durable. It has been found that the wax formulations disclosed herein achieve all three of the primary target characteristics and match the performance of a conventional petroleum wax.

Embodiments of the present wax formulation include natural ingredients which provide the wax with the desired lubricity, durability, and applicability while avoiding the use of petroleum-based products. Particularly, embodiments of the present wax formulation may include a first wax having a melting point of between about 125° F.-140° F., a second wax having a melting point between about 150° F.-170° F., and a third wax having a melting point between about 160° F.-180° F. Additionally, the wax formulation may also include a fourth wax having a melting point between about 170° F.-190° F.

In one embodiment, the wax formulation may include about 34%-44% by weight of a first wax having a melting point between about 150° F.-170° F. from about 27%-37% by weight of a second wax having a melting point between about 160° F.-180° F., and from about 15%-25% by weight of a third wax having a melting point between about 125° F.-140° F.

In one embodiment, the wax formulation includes at least 85% by weight percentage of a first wax including at least one of candelilla wax, carnauba wax, rice bran wax and castor wax, a second wax including at least one of pillar blend soy wax, palm wax, natural vegetable wax, Japan wax, and stearic acid, and a third wax including sunflower wax, bayberry wax, palm wax, and jojoba wax. In other embodiments, the wax formulation includes at least 88% and at least 94% by weight percentage of those waxes.

It has been found that pillar blend soy wax is harder, more dense, and has a higher melting point than standard soy wax, thereby making it more durable during snow equipment use and also easier to work with during the scraping process. In one embodiment, pillar blend soy wax is a soy wax that has a melting point of at least 130° F.

It has been found that the use of standard soy wax in quantities over 40% does not work well in cold snow and does not have good durability because the wax is soft and easily pulled from the snow equipment during use.

The percentage of certain waxes in the wax formulations are selected to achieve the desired performance balance of lubricity, durability, and applicability. Particularly, the wax formulation may include from about 34%-59% by weight of, alone or in combination, candelilla wax, carnauba wax, rice bran wax, and/or castor wax, from about 27%-37% by weight of, alone or in combination, sunflower wax, bayberry wax, palm wax, and jojoba wax, and from about 15%-25% by weight of, alone or in combination, pillar blend soy wax, palm wax, natural vegetable wax, Japan wax, and stearic acid. Further, the wax formulations may include jojoba oil up to about 4% by weight.

Other materials that may optionally be incorporated include a colorant to allow differently-formulated waxes intended for different snow conditions to be easily identified by users, and fragrance to provide the wax with a pleasant odor.

Further, to prevent oxidation of oils, if included, and thereby prevent a rancid smell, an antioxidant may be included in the wax composition. However, it was found that the use of jojoba oil does not require an antioxidant. In one embodiment, the total weight percentage of any added colorant, fragrance, and antioxidant does not exceed 1 wt %, and in another embodiment, does not exceed 0.5 wt %.

It is noted that other known ski waxes sometimes contain beeswax. However, it has been found that beeswax becomes tacky and difficult to scrape off when used in quantities that are greater than about 10% by weight in snow equipment waxes.

As provided in the examples below, different wax formulations can be provided depending on the snow conditions where the snow equipment will be used. For example, a "warm" wax can be a softer wax that is generally more water-repellent to combat wet friction. Additionally, a "cool" or mid-temperature wax can be formulated to counteract the effects of both dry and wet friction. Further, a "cold" wax can be a harder wax that is more durable, more abrasion-resistant, and more immune to scratching by sharp snow crystals caused by dry friction.

In one embodiment, to make the wax formulation into a form that can be applied to snow equipment, the ingredients for the wax are melted and mixed together and any fragrance or colorant, if desired, is added. The mixture is poured into a mold at about 175° F. to minimize the amount of shrinking and cracking during cooling. Further, the wax may be insulated during cooling to slow the process and reduce cracking.

The wax formulation was prepared and applied to snow equipment. Separately, a petroleum-based wax was applied to snow equipment and the snow equipment bearing each type of wax was tested. In multiple tests run over two courses, it was found that the inventive natural wax performed the same as the petroleum-based wax and that the results were statistically significant.

Embodiments of the present invention will be described with respect to the following non-limiting examples:

Example 1

A warm temperature wax formulation was made as follows:

| Material | Wt. % |
| --- | --- |
| Candelilla wax | 39% |
| Carnauba wax | 4% |
| Pillar blend soy wax | 20% |
| Jojoba oil | 2% |
| Sunflower wax | 35% |

Each of the ingredients were melted and mixed together. The mixture was then poured into molds at about 175° F. Once hardened, the resulting wax was able to be easily and evenly applied to snow equipment.

Example 2

A cool temperature wax formulation was made as follows:

| Material | Wt. % |
| --- | --- |
| Candelilla wax | 38% |
| Carnauba wax | 10% |
| Pillar blend soy wax | 21% |
| Jojoba oil | 1% |
| Sunflower wax | 30% |

Each of the ingredients were melted and mixed together. The mixture was then poured into molds at about 175° F. Once hardened, the resulting wax was able to be easily and evenly applied to snow equipment.

Example 3

A cold temperature wax formulation was made as follows:

| Material | Wt % |
| --- | --- |
| Candelilla wax | 38% |
| Carnauba wax | 12% |
| Pillar blend soy wax | 21% |
| Sunflower wax | 29% |

Each of the ingredients were melted and mixed together. The mixture was then poured into molds at about 175° F. Once hardened, the resulting wax was able to be easily and evenly applied to snow equipment.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A composition comprising:
   between about 34-59 wt % of a first wax including at least one of candelilla wax, carnauba wax, rice bran wax, and castor wax;
   between about 27-37% of a second wax including at least one of sunflower wax, bayberry wax, palm wax, and jojoba wax;
   between about 15-20 wt % of a third wax including at least one of pillar blend soy wax, palm wax, natural vegetable wax, Japan wax, and stearic acid, wherein the first wax, the second wax, and the third wax are different waxes; and
   at least one colorant or fragrance.

2. The composition of claim 1, further comprising up to 15 wt % of one or more additional materials selected from the group of additional natural waxes, natural plant oils, and hydrogenated plant oils.

3. The composition of claim 1, further comprising at least 4 wt % of a fourth wax including at least one of carnauba wax, candelilla wax, rice bran wax, and castor wax, wherein the fourth wax is different from the first, second, and third waxes.

4. The composition of claim 1, comprising at least 98% of the first wax, the second wax, and the third wax.

5. The composition of claim 1 comprising:
   at least 38 wt % of the first wax; and
   at least 29 wt % of the second wax.

6. The composition of claim 1 comprising at least 74 wt % of the first wax and the second wax.

7. The composition of claim 1, comprising at least 88% of the first wax, the second wax, and the third wax.

8. The composition of claim 1, comprising at least 94% of the first wax, the second wax, and the third wax.

9. A composition comprising:
   between about 34-59 wt % of a first natural wax having a melting point between about 150° F.-170° F.;
   between about 27-37 wt % of a second natural wax having a melting point between about 160° F.-180° F.;
   between about 15-20 wt % of a third natural wax having a melting point between about 125° F.-140° F., wherein the first natural wax, the second natural wax, and the third natural wax are different waxes; and
   at least one colorant or fragrance.

10. The composition of claim 9 further comprising up to 15 wt % of one or more additional materials selected from the group of additional natural waxes, natural plant oils, and hydrogenated plant oils.

11. The composition of claim 9, comprising at least 88% of the first natural wax, the second natural wax, and the third natural wax.

12. The composition of claim 9, further comprising at least 4 wt % of a fourth natural wax including at least one of carnauba wax, candelilla wax, rice bran wax, and castor wax.

13. The composition of claim 9, comprising at least 94% of the first natural wax, the second natural wax, and the third natural wax.

14. The composition of claim 9, further comprising at least 1 wt % of jojoba oil.

15. The composition of claim 9, further comprising a fourth natural wax having a melting point between about 170°-190° F.

16. The composition of claim 9 comprising:
at least 38 wt % of the first natural wax; and
at least 29 wt % of the second natural wax.

17. The composition of claim 9 comprising at least 74 wt % of the first natural wax and the second natural wax.

18. A composition comprising:
between about 34-59 wt % of a first wax including at least one of candelilla wax, carnauba wax, rice bran wax, and castor wax;
between about 27-37% of a second wax including at least one of sunflower wax, bayberry wax, palm wax, and jojoba wax;
between about 15-20 wt % of a third wax including at least one of pillar blend soy wax, palm wax, natural vegetable wax, Japan wax, and stearic acid, wherein the first wax, the second wax, and the third wax are different waxes; and
at least 1 wt % of jojoba oil.

\* \* \* \* \*

UNITED STATES PATENT AND TRADEMARK OFFICE
CERTIFICATE OF CORRECTION

PATENT NO. : 11,059,975 B1
APPLICATION NO. : 16/791660
DATED : July 13, 2021
INVENTOR(S) : Arlein It is certified that error appears in the above-identified patent and that said Letters Patent is hereby corrected as shown below:

On the Title Page
Column 1; item (63) Related U.S. Application Data    Delete "Continuation of" and
Insert --Continuation in part of--

Signed and Sealed this
Fifth Day of July, 2022

Katherine Kelly Vidal
*Director of the United States Patent and Trademark Office*